(12) United States Patent
Hsu et al.

(10) Patent No.: US 7,903,217 B2
(45) Date of Patent: Mar. 8, 2011

(54) LIQUID CRYSTAL DISPLAY PANEL AND LIQUID CRYSTAL DISPLAY DEVICE USING THE SAME

(75) Inventors: Che-Ming Hsu, Tainan County (TW); Chien-Hong Chen, Tainan County (TW); Ming-Feng Hsieh, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 169 days.

(21) Appl. No.: 12/268,749

(22) Filed: Nov. 11, 2008

(65) Prior Publication Data

US 2009/0122246 A1    May 14, 2009

(30) Foreign Application Priority Data

Nov. 12, 2007   (TW) ................................ 96142762 A

(51) Int. Cl.
*G02F 1/1337* (2006.01)
(52) U.S. Cl. ........................ 349/129; 349/123; 349/143

(58) Field of Classification Search .................. None
See application file for complete search history.

(56) References Cited

U.S. PATENT DOCUMENTS

| | | | |
|---|---|---|---|
| 6,285,431 B2 | 9/2001 | Lyu et al. | |
| 7,072,017 B1 * | 7/2006 | Yoo et al. | 349/129 |
| 7,079,211 B2 * | 7/2006 | Kim et al. | 349/129 |
| 7,728,938 B2 * | 6/2010 | Chang et al. | 349/129 |
| 2003/0071952 A1 | 4/2003 | Yoshida et al. | |
| 2006/0077332 A1 * | 4/2006 | Ohmuro et al. | 349/144 |
| 2008/0143911 A1 * | 6/2008 | Jin et al. | 349/48 |

* cited by examiner

*Primary Examiner* — Tina M Wong

(57) ABSTRACT

A liquid crystal display (LCD) panel and an LCD device using the same are provided. The LCD panel at least includes a first color pixel and a second color pixel for displaying different colors. The second color pixel is disposed next to the first color pixel. The liquid crystal molecules in the first color pixel have at least four liquid crystal (LC) orientations including a first LC orientation. The liquid crystal molecules in the second color pixel have a plurality of LC orientations including a second LC orientation. The first LC orientation is different from all LC orientations of the second color pixel.

19 Claims, 7 Drawing Sheets

LIQUID CRYSTAL DISPLAY PANEL AND LIQUID CRYSTAL DISPLAY DEVICE USING THE SAME

This application claims the benefit of Taiwan application Serial No. 096142762, filed Nov. 12, 2007, the entire disclosure of which is incorporated herein by reference.

BACKGROUND

1. Technical Field

The disclosure relates in general to a liquid crystal display (LCD) panel and an LCD device using the same, and, in some embodiments, to a multiple-domain vertical alignment (MVA) LCD panel and an LCD device using the same.

2. Description of the Related Art

In a multiple-domain vertical alignment (MVA) liquid crystal display (LCD) panel known to the inventor(s), the liquid crystal molecules in each specific domain tilt in different directions. FIG. 1A shows a known MVA LCD panel 10. The LCD panel at least includes a red pixel, a green pixel and a blue pixel. Each pixel 11 normally has four liquid crystal (LC) orientations, and such alignment is called 4-domain alignment as indicated by the arrows of FIG. 1A. The LC orientations are oblique to and respectively form an angle of 45 degrees with the X axis and Y axis of the LCD panel 10 for providing a wide angle function. Slits of the pixel electrode and protrusions of the counter electrode are arranged to form several boundaries for the liquid crystal orientations. A boundary is the disclination formed between liquid crystal molecules of different LC orientations and restricts the transmittivity of the backlight. Another MVA LCD panel known to the inventor(s) can improve the transmittivity by reducing the number of the liquid crystal orientations to two. Each color pixel still has two opposite liquid crystal orientations, and is still capable of providing a wide view angle. The liquid crystal orientations of the pixels are all parallel to or perpendicular to a long-axial direction of the color pixels.

FIG. 1B shows such another known MVA LCD panel 10'. The LCD panel 10' at least includes a blue pixel 11', a green pixel 12' and a red pixel 13'. The liquid crystal molecules in the blue pixel 11', the green pixel 12' and the red pixel 13' all have a first LC orientation X1 and a second LC orientation X2. The first LC orientation X1 is opposite to the second LC orientation X2, wherein the two LC orientations X1 and X2 are both parallel to a horizontal direction of the LCD panel 10' and perpendicular to a long-axial direction L of the blue pixel 11', the green pixel 12' and the red pixel 13'. The LCD panel 10' further includes several protrusions 14' positioned in the color filter substrate and several slits 15' positioned on the thin-film transistor substrate. The slits 15' further connect to several fine slits 16' such that the liquid crystal molecules tilt faster when driven by the electrical field. That is, the response speed of the liquid crystal layer is increased so as to speed up the changing in grey level. The protrusions 14' are parallel to the long-axial direction L, the slits 15' are parallel to the protrusions 14', and the fine slits 16' are perpendicular to the protrusions 14'. The blue pixel 11', the green pixel 12' and the red pixel 13' respectively each have a protrusion 14' and two slits 15', wherein the one protrusion 14' is respectively disposed at a central position of the blue pixel 11', the green pixel 12' and the red pixel 13', and the two slits 15' are respectively disposed at the two sides of the each protrusion 14'. The protrusions 14' and the slits 15' are used for controlling the liquid crystal orientations in the blue pixel 11', the green pixel 12' and the red pixel 13'. Compared with the 4-domain alignment LCD panel 10 (FIG. 1A), the transmittivity of the LCD panel 10' whose pixels have the above 2-domain alignment design is increased by 16%. As there are only two liquid crystal orientations being parallel to the horizontal direction of liquid crystal panel 10' (that is, there are only two domains), when the white color is displayed by way of the blue pixel 11', the green pixel 12' and the red pixel 13', color shift will occur. For example, bluish green color shift will occur when viewed from the horizontal direction and yellowish color shift will occur when viewed from the vertical direction.

FIG. 1C shows a Commission International d'Eclairage (CIE) 1931 color space chromaticity diagram. The chromaticity diagram includes a red domain R1, a green domain R2 and a blue domain R3. The coordinate of the chromaticity of a white-displayed picture measured in the normal direction of the LCD panel 10' (that is, viewed right from the normal top of the LCD panel 10') is (0.28607, 0.2952) and is designated as the first coordinate point P1. The coordinate of the chromaticity of the same a white-displayed picture measured at an angle of depression of 60 degrees from a direction parallel to the first LC orientation X1 (FIG. 1B) of the LCD panel 10' (that is, the chromaticity is measured when the view angle is 60 degree from the horizontal direction of the LCD panel 10') is (0.28463,0.29907) and is designated as the second coordinate point P2. The coordinate of the chromaticity of the same white-displayed picture measured at an angle of depression of 60 degrees in a direction perpendicular to the first LC orientation X1 of the LCD panel 10' (that is, the chromaticity is measured when the view angle is 60 degree from the vertical direction of the LCD panel 10') is (0.38187,0.3782) and is designated as the third coordinate point P3. As indicated in FIG. 1C, the third coordinate point P3 is farther away from the blue domain R3 (that is, closer to the red domain R1 and the green domain R2) than the first coordinate point P1. Thus, the white color is more yellowish when the LCD panel 10' is viewed from a view angle in a direction perpendicular to the first LC orientation X1 than when the LCD panel 10' is viewed right from the normal top of the LCD panel 10'. On the other hand, when the LCD panel 10' is viewed from a view angle of 60 degrees in a direction parallel to the first LC orientation X1, the white color is bluish green. And then when the LCD panel 10' is viewed from the same view angle of 60 degrees, the LCD panel 10' has a color difference of 0.1254 between a view at a view angle of 60 degrees from the direction parallel to the first LC orientation X1 and a view at a view angle of 60 degrees from the direction perpendicular to the first LC orientation X1 (the distance between the second coordinate point P2 and the third coordinate point P3). However, when the LCD panel 10 whose pixels have 4-domain alignment as indicated in FIG. 1A is measured, the coordinate of the second coordinate point P2 is (0.31007, 0.3293), and the coordinate of the third coordinate point P3 is (0.3142, 0.32957). That is, the white picture is yellowish when viewed from a horizontal or a vertical direction, and the color difference is only about 0.00414. Therefore, when observing from different directions, the user can hardly notice any difference in color shift, and then can hardly feel the color shift of the entire picture displayed by the LCD panel 10.

In summary, in the MVA LCD panel 10', the displayed picture shows different tendencies of color shift when viewed from different directions. Despite that the transmittivity and brightness are improved through the design which uses fewer domains, different tendencies of color shift occur when the LCD panel 10' is viewed from different directions, largely deteriorating the user's comfort in viewing the displayed pictures. In contrast, the MVA LCD panel 10 does not have noticeable color shift issues, but suffers from lower transmittivity and brightness. Thus, both transmittivity and color shift are issues to be considered.

BRIEF DESCRIPTION OF THE DRAWINGS

Embodiments of the invention will become more fully understood from the following detailed description and accompanying drawings, which are given for illustration only, and thus are not limitative of the present invention, wherein the same references relate to the same elements, and wherein.

DETAILED DESCRIPTION OF EMBODIMENTS

First Embodiment

Figure 2:
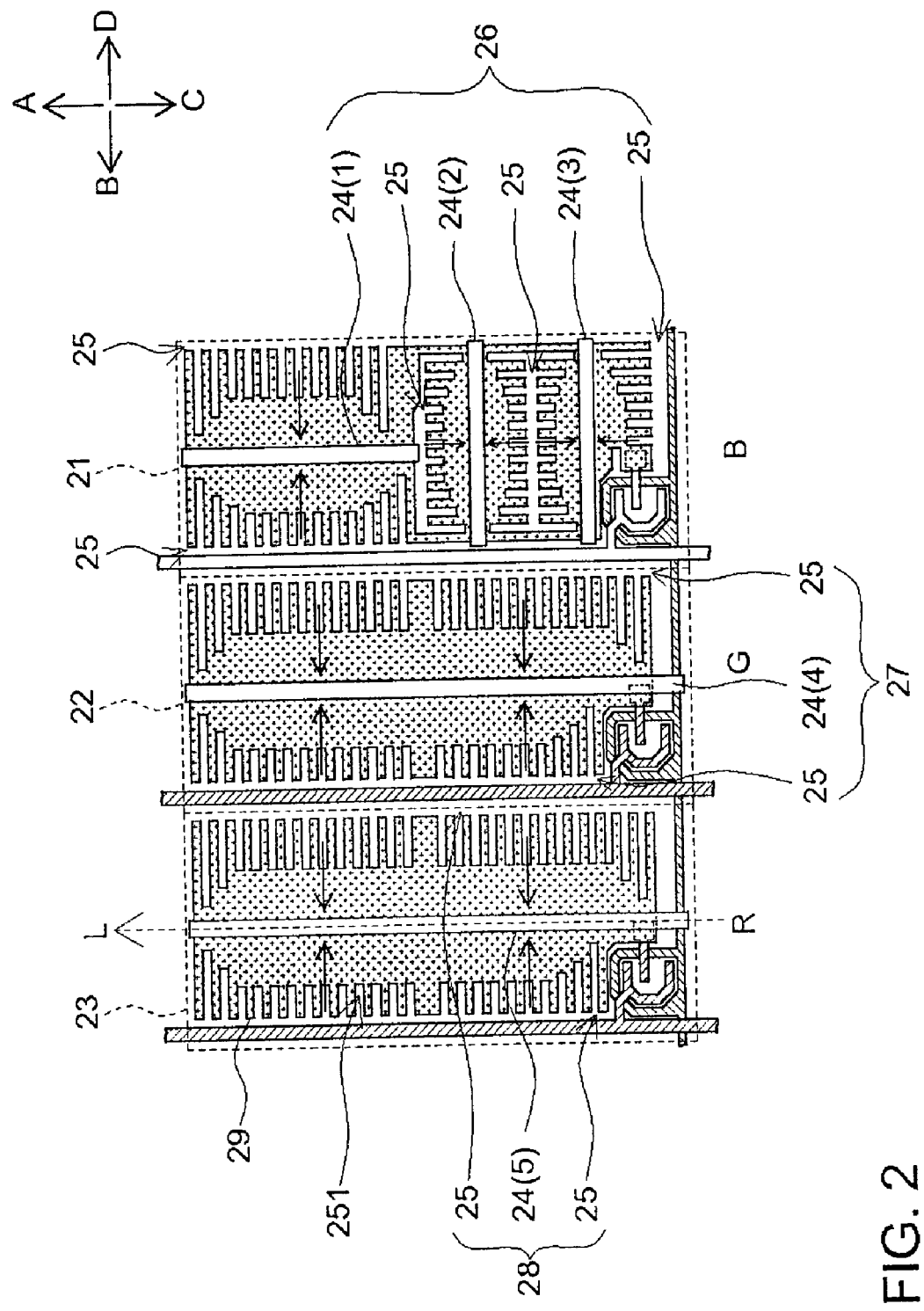
FIG. 2 shows a schematic plan view of an LCD panel according to a first embodiment of the invention.

FIG. 2 shows a schematic plan view of an LCD panel 20 according to a first embodiment of the invention. The LCD panel 20 at least includes a first color pixel 21 and a second color pixel 22. The first color pixel 21 is used for displaying one color. The second color pixel 22 disposed next to the first color pixel 21 is used for displaying another color. The liquid crystal molecules in the first color pixel 21 at least have a first LC orientation A. The liquid crystal molecules in the second color pixel 22 at least have a second LC orientation B. The first LC orientation A is different from the second LC orientation B.

Furthermore, the first color pixel 21 and the second color pixel 22 respectively have the same long-axial direction L, wherein the first LC orientation A is parallel to the long-axial direction L, and the second LC orientation B is perpendicular to the long-axial direction L. That is, the first LC orientation A is perpendicular to the second LC orientation B. Other arrangements are, however, not excluded. For example, the first LC orientation A and the second LC orientation B in some embodiments are oblique, e.g., at 45 degrees, to the long-axial direction L and/or to each other. The LCD panel 20 includes a first liquid crystal alignment controlling structure 26, a second liquid crystal alignment controlling structure 27 and in this embodiment, further includes a third color pixel 23 and a third liquid crystal alignment controlling structure 28. The third color pixel 23 is disposed next to the second color pixel 22. The first liquid crystal alignment controlling structure 26, the second liquid crystal alignment controlling structure 27 and the third liquid crystal alignment controlling structure 28 respectively disposed at positions corresponding to the first color pixel 21, the second color pixel 22 and the third color pixel 23 are used for controlling the LC orientations of the liquid crystal molecules of the first color pixel 21, the second color pixel 22 and the third color pixel 23, respectively. In this embodiment of the invention, the first color pixel 21, the second color pixel 22 and the third color pixel 23 respectively can be the blue color pixel (B), the green color pixel (G) and the red color pixel (R).

In this embodiment, the first liquid crystal alignment controlling structure 26 includes three protrusions 24 (1), 24 (2) and 24 (3) and several slits 25 and fine slits 251. During the manufacturing process of the LCD panel 20, the slits 25 and the fine slits 251 are formed in each of the pixel electrode 29 with various layouts, according to a patterning technology such as photo-lithography or etching technology, when the pixel electrode(s) 29 is formed on a thin-film transistor substrate. Also, after an counter electrode is formed on a counter substrate, the protrusions 24 (1), 24 (2) and 24 (3) made of insulative, photosensitive resin are formed on the counter electrode by way of a patterning process. The slits 25 are respectively disposed at the two sides of the protrusions 24 (1), 24 (2) and 24 (3), wherein the slits 25 and the protrusions 24 (1), 24 (2) and 24 (3) are alternately disposed. The protrusion 24 (1) is parallel to the long-axial direction L, and the other two protrusions 24 (2) and 24 (3) are perpendicular to the long-axial direction L.

In this embodiment, the second liquid crystal alignment controlling structure 27 includes a protrusion 24 (4) and two slits 25. The protrusion 24 (4) is parallel to the long-axial direction L and substantially positioned at the center of the second color pixel 22. The slits 25 are respectively disposed at the two sides of the protrusions 24 (4). The third liquid crystal alignment controlling structure 28 includes a protrusion 24 (5) and two slits 25. The protrusion 24 (5) is parallel to the long-axial direction L and substantially positioned at the center of the third color pixel 23. The slits 25 are respectively disposed at the two sides of the protrusions 24 (5). The second liquid crystal alignment controlling structure 27 forms fewer liquid crystal LC orientations (that is, fewer domains) and boundaries than the first liquid crystal alignment controlling structure 26. The second liquid crystal alignment controlling structure 27 forms the same number of domains and boundaries as the third liquid crystal alignment controlling structure 28. Other arrangements are, however, not excluded. For example, the number of domains and/or the orientations of the protrusions and/or slits and/or fine slits of each liquid crystal alignment controlling structure can vary as needed.

In FIG. 2, as the first liquid crystal alignment controlling structure 26 includes a protrusion 24 (1) parallel to the long-axial direction L and two protrusions 24 (2) and 24 (3) perpendicular to the long-axial direction, the liquid crystal molecules in the first color pixel 21 further have the second LC orientation B, a third LC orientation C and a fourth LC orientation D in addition to the abovementioned first LC orientation A. The LC orientations of liquid crystal molecules are denoted by the arrows illustrated in the color pixels 21, 22 and 23. The third LC orientation C is opposite to the first LC orientation A, and the fourth LC orientation D is opposite to the second LC orientation B. The liquid crystal molecules in the second color pixel 22 and the third color pixel 23 only have the second LC orientation B and the fourth LC orientation D. That is, the liquid crystal molecules in the first color pixel 21 have four liquid crystal orientations parallel or perpendicular to the long-axial direction L, i.e., the liquid crystal molecules in the first color pixel 21 have 4-domain liquid crystal alignment. By increasing the number of domains, the color difference issue that might occur when viewing the LCD panel 20 from a horizontal direction and from a vertical direction is improved.

Figure 1A:
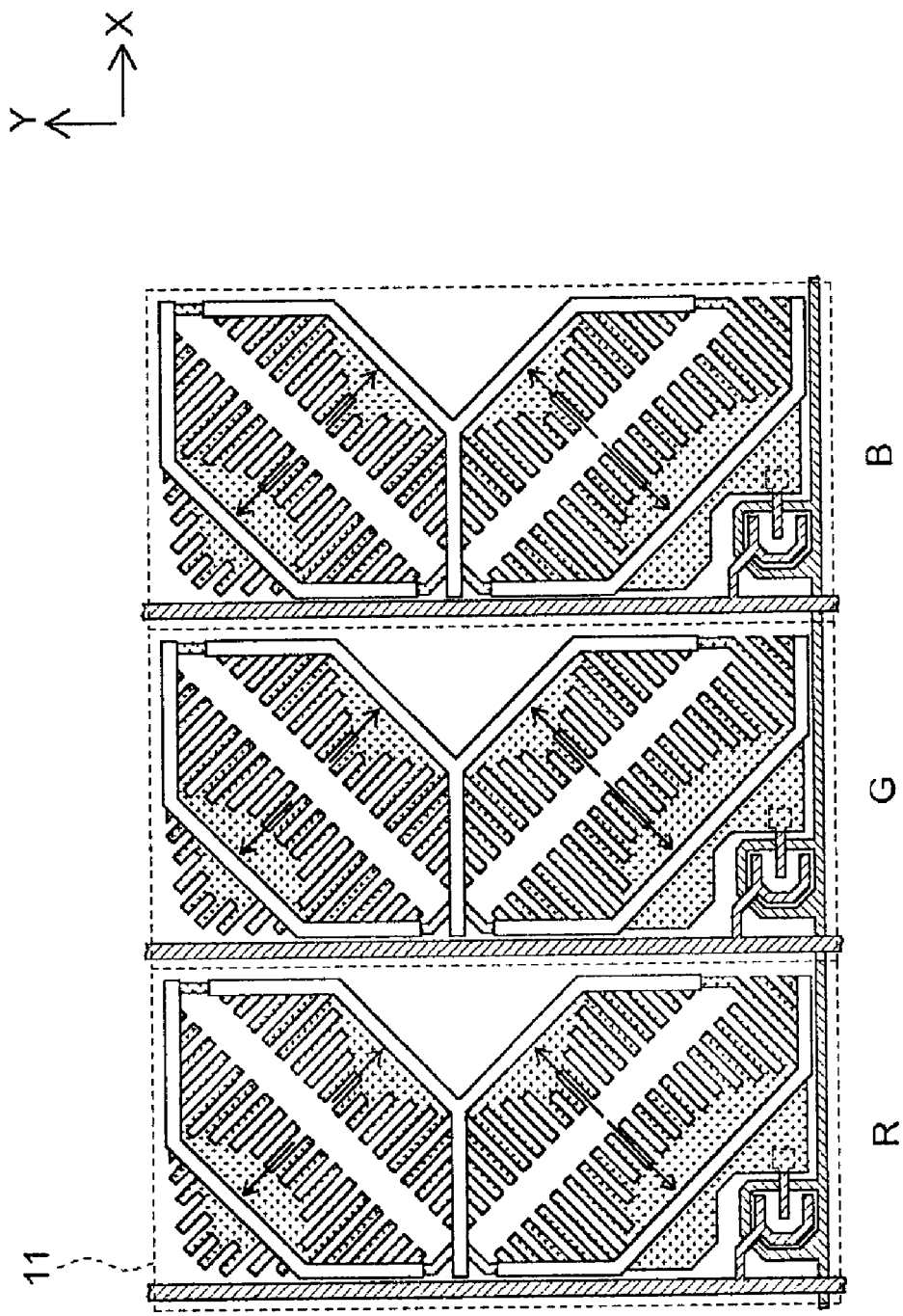
FIG. 1A shows a schematic plan view of an MVA LCD panel known to the inventor(s)
Figure 1B:
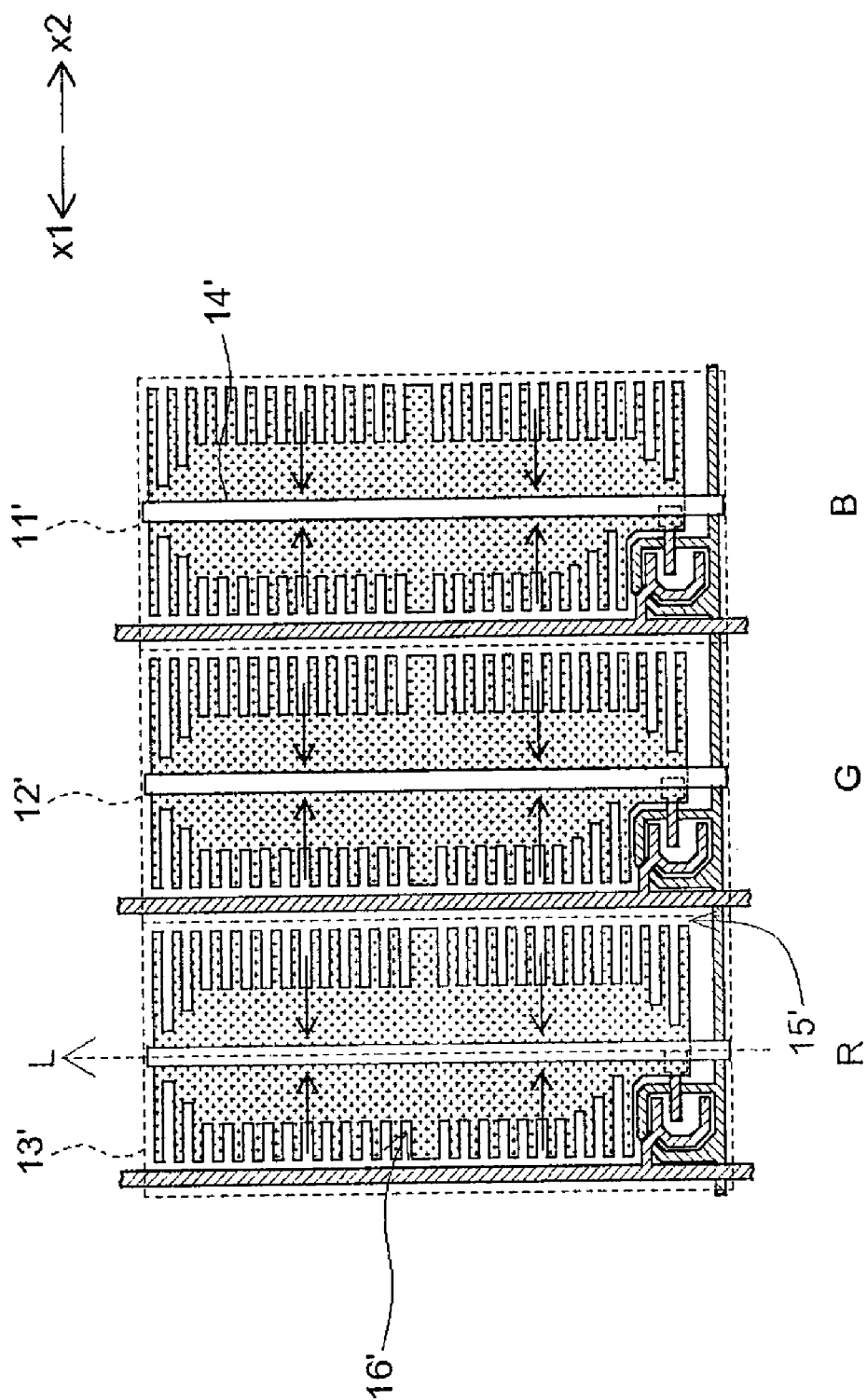
FIG. 1B shows a schematic plan view of another MVA LCD panel known to the inventor(s)
Figure 1C:
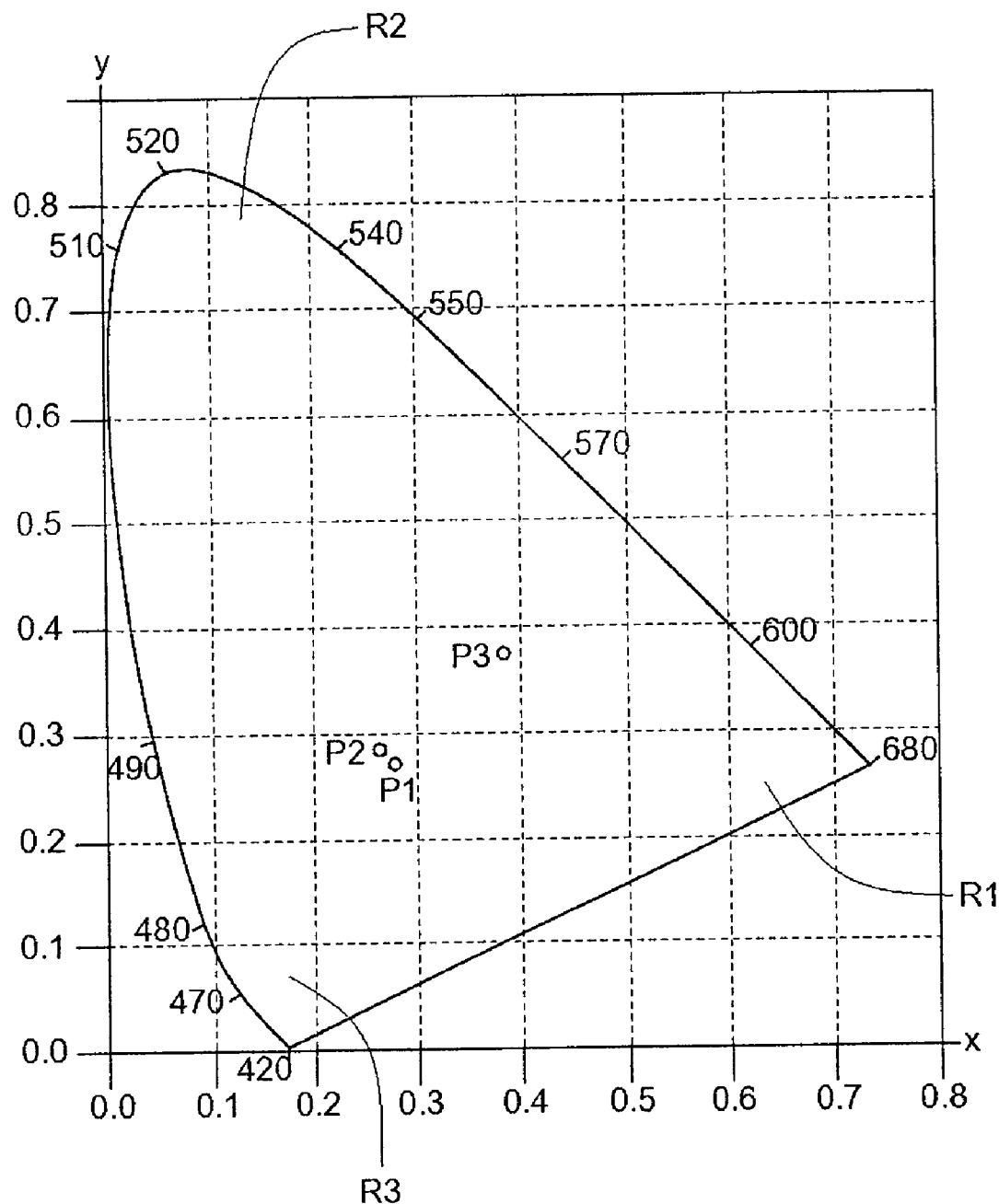
FIG. 1C shows a CIE chromaticity diagram.

In particular, the chromaticity of a white-displayed picture viewed from the direction parallel to the first LC orientation A and the chromaticity of a white-displayed picture viewed from the direction parallel to the second LC orientation B are respectively measured at an angle of depression of 60 degrees relative to the LCD panel 20. According to the measurement results of the two chromaticities, the color difference between the two directions is 0.0691, which is smaller than the color difference 0.1254 obtained in the multiple-domain vertical alignment (MVA) LCD panel 10' (illustrated in FIG. 1B). Besides, as the first liquid crystal alignment controlling structure 26 has more boundaries than the pixel 11 of FIG. 1B, the transmittivity of the first color pixel 21 will decrease slightly. Setting the transmittivity of the MVA LCD panel 10' of FIG. 1B as a base, the transmittivity of the LCD panel 20 of the present embodiment of the invention only decreases by 1.04%. This is because in the present embodiment of the invention, the protrusions 24(2) and 24(3) used for increasing the number of liquid crystal orientations are disposed in the domain of the blue (B) color pixel which is less sensitive to the human eyes, hence having less influence in the transmittivity. Compared with the LCD panel 10 of FIG. 1A, the LCD panel 20 of the present embodiment of the invention still increases the transmittivity by about 15%. Compared with the LCD panel 10' of FIG. 1B, the LCD panel 20 of the present embodiment of the invention reduces the color difference almost by half.

According to the above disclosure, the LCD panel 20 disclosed in the first embodiment of the invention has lower color difference between a view at a view angle of 60 degrees from a direction parallel to the first LC orientation A and a view at a view angle of 60 degrees from a direction parallel to the second LC orientation B, and the transmittivity is only slightly affected. That is, when the user view the LCD panel 20 at an angle, the difference in color shift between different view directions decreases, hence improving the accuracy in the displayed color and providing the user with greater comfort in viewing the displayed pictures.

Moreover, an LCD device is formed if a backlight module is further disposed under the LCD panel 20. The backlight module is used for providing light that is controllably allowed to pass through the LCD panel 20 to display pictures.

Second Embodiment

Figure 3:
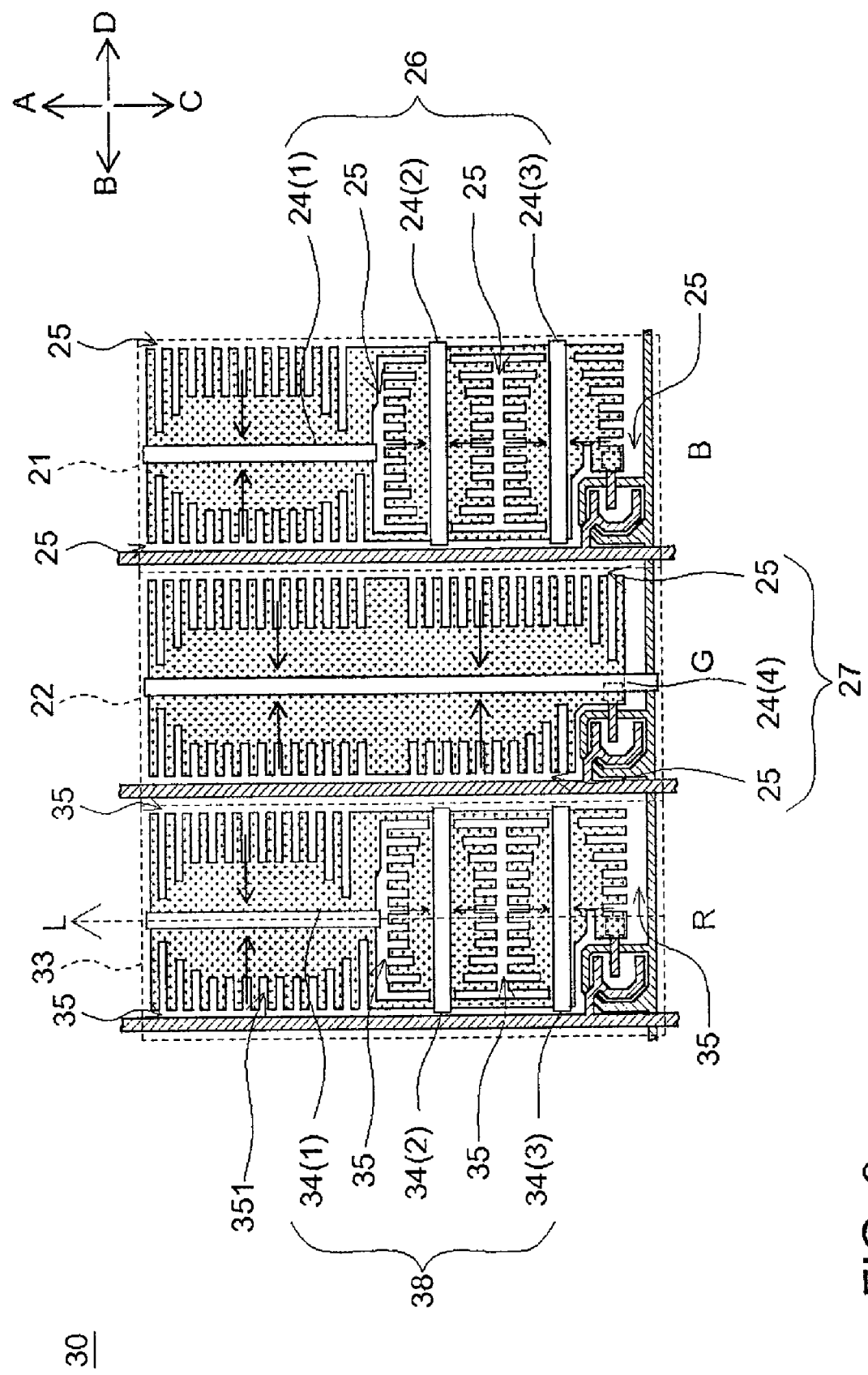
FIG. 3 shows a schematic plan view of an LCD panel according to a second embodiment of the invention.

FIG. 3 shows a schematic plan view of an LCD panel 30 according to a second embodiment of the invention. The LCD panel 30 of the present embodiment of the invention differs from the LCD panel 20 of the first embodiment of the invention in the layout of the third liquid crystal alignment controlling structure 38, and other similarities are not repeated herein.

The third liquid crystal alignment controlling structure 38 includes three protrusions 34 (1), 34 (2) and 34 (3) and several slits 35 and fine slits 351. The slits 35 and the fine slits 351 are respectively disposed at the two sides of the protrusions 34 (1), 34 (2) and 34 (3), wherein the slits 35 and the protrusions 34 (1), 34 (2) and 34 (3) are alternately disposed. The protrusion 34 (1) is parallel to the long-axial direction L, and the protrusions 34 (2) and 34 (3) are perpendicular to the long-axial direction L. In detail, as the third liquid crystal alignment controlling structure 38 and the first liquid crystal alignment controlling structure 26 have the same layout, the liquid crystal molecules in the third color pixel 33 and the first color pixel 21 both have the first LC orientation A, the second LC orientation B, the third LC orientation C and the fourth LC orientation D. That is, the first color pixel 21 for displaying the blue color and the third color pixel 33 for displaying the red color both have four liquid crystal orientations, and the second color pixel 22 for displaying the green color has two liquid crystal orientations perpendicular to the long-axial direction L. Again, other arrangements are not excluded. For example, the number of domains and/or the orientations of the protrusions and/or slits and/or fine slits of each liquid crystal alignment controlling structure can vary as needed.

The chromaticity of a white-displayed picture viewed from the direction parallel to the first LC orientation A and the chromaticity of a white-displayed picture viewed from the direction parallel to the second LC orientation B are respectively measured at an angle of depression of 60 degrees relative to the LCD panel 30. According to the obtained measurement results of the two chromaticities, the color difference between the two view directions is 0.0267, which is smaller than the color difference 0.1254 obtained in the multiple-domain vertical alignment (MVA) LCD panel 10' (illustrated in FIG. 1B). That is, the LCD panel 30 of the second embodiment of the invention has a smaller color difference between the direction parallel to the first LC orientation A and the direction parallel to the second LC orientation B at an oblique view angle. Thus, the difference of color shift between different view directions is reduced in the LCD panel 30 compared to MVA LCD panel 10'.

Third Embodiment

Figure 4:
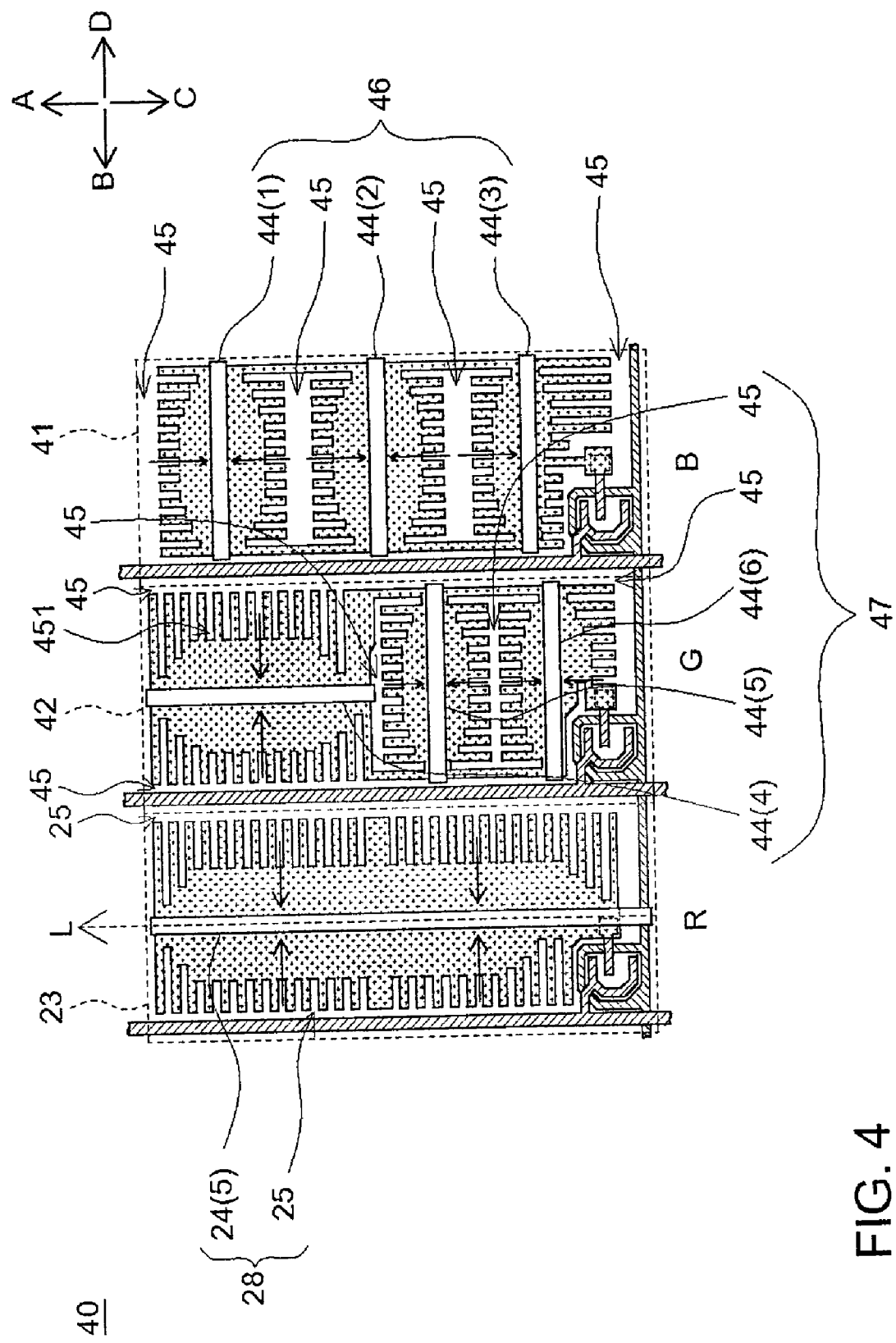
FIG. 4 shows a schematic plan view of an LCD panel according to a third embodiment of the invention.

FIG. 4 shows a schematic plan view of an LCD panel 40 according to a third embodiment of the invention. The LCD panel 40 of the present embodiment of the invention differs from the LCD panel 20 of the invention the first embodiment in the layout of the first liquid crystal alignment controlling structure 46 and the second liquid crystal alignment controlling structure 47, and other similarities are not repeated herein.

The first liquid crystal alignment controlling structure 46 includes three protrusions 44 (1), 44 (2) and 44 (3) and several slits 45 and fine slits 451. The protrusions 44 (1), 44 (2) and 44 (3) are all perpendicular to the long-axial direction L. The slits 45 and the fine slits 451 are respectively disposed at the two sides of the protrusions 44 (1), 44 (2) and 44 (3), wherein the slits 45 and the protrusions 44 (1), 44 (2) and 44 (3) are alternately disposed. The second liquid crystal alignment controlling structure 47 includes several, in some embodiments, three protrusions 44 (4), 44 (5) and 44 (6) and at least one, in some embodiments, several slits 45 and fine slits 451. The protrusion 44 (4) is parallel to the long-axial direction L, and the protrusions 44 (5) and 44 (6) are perpendicular to the long-axial direction L. The slits 45 and the fine slits 451 are respectively disposed at the two sides of the protrusions 44 (4), 44 (5) and 44 (6), wherein the slits 45 and the protrusions 44 (4), 44 (5) and 44 (6) are alternately disposed.

As the protrusions 44 (1), 44 (2) and 44 (3) of the first liquid crystal alignment controlling structure 46 are all perpendicular to the long-axial direction L, the liquid crystal molecules in the first color pixel 41 have the first LC orientation A and the third LC orientation C. The second liquid crystal alignment controlling structure 47 includes a protrusion 44 (4) parallel to the long-axial direction L and two protrusions 44 (5) and 44 (6) perpendicular to the long-axial direction, therefore the liquid crystal molecules in the second color pixel 42 have the first LC orientation A, the second LC orientation B, the third LC orientation C and the fourth LC orientation D. That is, the first color pixel 41 for displaying the blue color has two liquid crystal orientations parallel to the long-axial direction L, the third color pixel 23 for displaying the red color has two liquid crystal orientations perpendicular to the long-axial direction L, and the second color pixel 42 for displaying the green color has four liquid crystal orientations parallel or perpendicular to the long-axial direction L. Again, other arrangements are not excluded. For example, the number of domains and/or the orientations of the protrusions and/or slits and/or fine slits of each liquid crystal alignment controlling structure can vary as needed.

The chromaticity of a white-displayed picture viewed from the direction parallel to the first LC orientation A and the chromaticity of a white-displayed picture viewed from the direction parallel to the second LC orientation B are respectively measured at an angle of depression of 60 degrees relative to the LCD panel 40. According to the obtained results of the measurement of the two chromaticities, the color difference between the two view angles is 0.049, which is smaller than the color difference 0.1254 obtained in the multiple-domain vertical alignment (MVA) LCD panel 10' (illustrated in FIG. 1B). That is, the LCD panel 40 of the third embodiment of the invention has a smaller color difference between the view angle parallel to the first LC orientation A and the view angle parallel to the second LC orientation B. Thus, the difference of color shift between different view directions is reduced in the LCD panel 40 compared to MVA LCD panel 10'.

Fourth Embodiment

Figure 5:
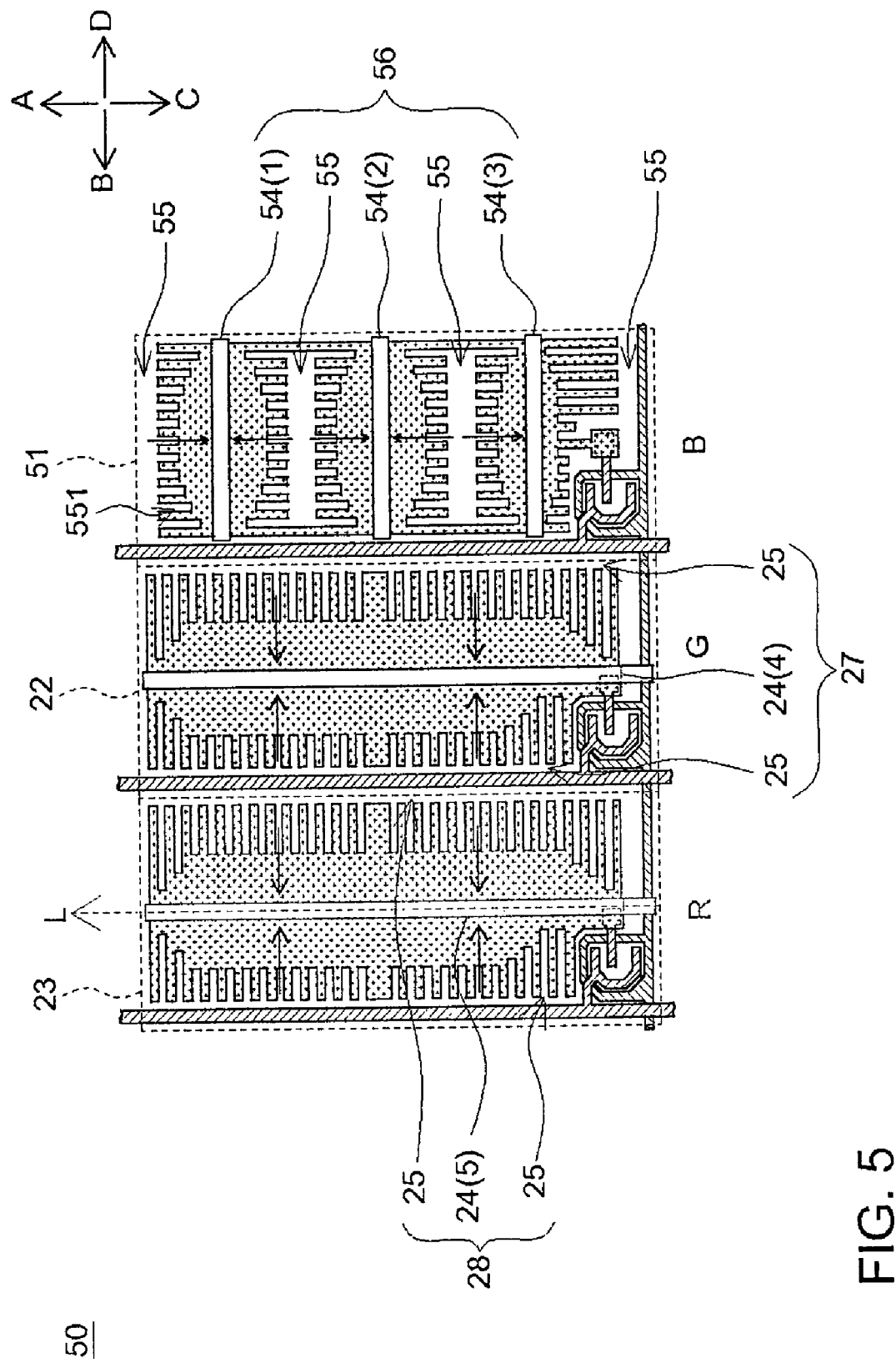
FIG. 5 shows a schematic plan view of an LCD panel according to a fourth embodiment of the invention.

FIG. 5 shows a schematic plan view of an LCD panel 50 according to a fourth embodiment of the invention. The LCD panel 50 of the present embodiment of the invention differs from the LCD panel 20 of the first embodiment of the invention in the disposition of the first liquid crystal alignment controlling structure 56, and other similarities are not repeated herein.

The first liquid crystal alignment controlling structure 56 includes several, in some embodiments, three protrusions 54 (1), 54 (2) and 54 (3) and at least one, in some embodiments, several slits 55 and fine slits 551. The protrusions 54 (1), 54 (2) and 54 (3) are perpendicular to the long-axial direction L. The slits 55 and the fine slits 551 are respectively disposed at the two sides of the protrusions 54 (1), 54 (2) and 54 (3), wherein the slits 55 and the protrusions 54 (1), 54 (2) and 54 (3) are alternately disposed. The liquid crystal molecules in the first color pixel 51 have the first LC orientation A and the third LC orientation C. As the second liquid crystal alignment controlling structure 27 and the third liquid crystal alignment controlling structure 28 are disposed in the same way as in the first embodiment, the liquid crystal molecules in the second color pixel 22 and the third color pixel 23 also have the second LC orientation B and the fourth LC orientation D. That is, the first color pixel 51 has two liquid crystal orientations parallel to the long-axial direction L, and the second color pixel 22 and the third color pixel 23 have two liquid crystal orientations perpendicular to the long-axial direction L. Besides, the first liquid crystal alignment controlling structure 56 forms more liquid crystal orientation boundaries than the second liquid crystal alignment controlling structure 27 and the third liquid crystal alignment controlling structure 28. Again, other arrangements are not excluded. For example, the number of domains and/or the orientations of the protrusions and/or slits and/or fine slits of each liquid crystal alignment controlling structure can vary as needed.

The chromaticity of a white-displayed picture viewed from the view angle parallel to the first LC orientation A and the chromaticity of a white-displayed picture viewed from the view angle parallel to the second LC orientation B are respectively measured from an angle of depression of 60 degrees relative to the LCD panel 50. According to the obtained results of the measurement of the two chromaticities, the color difference between the two view angles is 0.0503, which is smaller than the color difference 0.1254 obtained in the multiple-domain vertical alignment (MVA) LCD panel 10' (illustrated in FIG. 1B). As the first liquid crystal alignment controlling structure 56 has more domains and boundaries than the pixel 11' of FIG. 1B, the transmittivity of the first color pixel 51 will decrease slightly. Using the transmittivity of the MVA LCD panel 10' as reference, the transmittivity of the LCD panel 50 of the present embodiment of the invention only decreases by 1.01%.

That is, the LCD panel 50 of the fourth embodiment of the invention has a smaller color difference between the view angle parallel to the first LC orientation A and the view angle parallel to the second LC orientation B. Thus, the difference of color shift between different view directions is reduced in the LCD panel 50, compared to MVA LCD panel 10', without significantly affecting the transmittivity.

Measurement Results:

The LCD panel 30 of the second embodiment differs from the LCD panel 20 of the first embodiment in that the liquid crystal molecules in the third color pixel 33 for displaying the red color further have the first LC orientation A and the third LC orientation C in addition to the second LC orientation B and the fourth LC orientation D. As the first liquid crystal alignment controlling structure 26 and the second liquid crystal alignment controlling structure 27 have the same layout, when a white-colored picture is viewed from an angle of depression of 60 degrees in a horizontal direction and a vertical direction, respectively, the color difference measured in the LCD panel 20 of the first embodiment is 0.0691, and the color difference measured in the LCD panel 30 of the second embodiment is 0.0267. That is, the color difference decreases by 0.0424 when the number of the LC orientations of the liquid crystal molecules in the third color pixel 33 for displaying the red color increase from two to four.

The LCD panel 40 of the third embodiment differs from the LCD panel 50 of the fourth embodiment in that the liquid crystal molecules in the second color pixel 42 for displaying the green color further have the first LC orientation A and the third LC orientation C in addition to the second LC orientation B and the fourth LC orientation D. As the first liquid crystal alignment controlling structure 46 and the third liquid crystal alignment controlling structure 28 have the same layout, when a white-colored picture is viewed from an angle of depression of 60 degrees in a horizontal direction and a vertical direction, respectively, the color difference measured in the LCD panel 40 of the third embodiment is 0.049, and the color difference measured in the LCD panel 50 of the fourth embodiment is 0.0503. That is, the color difference decreases by 0.0013 when the number of the LC orientations of the liquid crystal molecules in the second color pixel 42 for displaying the green color increases from two to four.

The LCD panel 20 of the first embodiment differs from the known LCD panel 10' in that the liquid crystal molecules in the first color pixel 21 for displaying the blue color further have the first LC orientation A and the third LC orientation C in addition to the second LC orientation B and the fourth LC orientation D. Assuming that the second liquid crystal alignment controlling structure 27 and the third liquid crystal alignment controlling structure 28 are the same in both LCD panels 20 and 10', when a white-colored picture is viewed from an angle of depression of 60 degrees in a horizontal direction and a vertical direction, respectively, the color difference measured in the LCD panel 10' is 0.1254, and the color difference measured in the LCD panel 20 of the first embodiment is 0.0691. That is, the color difference decreases by 0.0563 when the LC orientations of the liquid crystal molecules in the first color pixel 21 for displaying the blue color increases from two to four.

Besides, compared with the transmittivity measured in the 4-domain alignment LCD panel 10 (FIG. 1A), the transmittivity measured in the LCD panels 20, 30, 40 and 50 of the first to fourth embodiments respectively increases by 15.33%, 9.88%, 6.19% and 15.36%. As discussed with respect to the LCD panel 30 of the second embodiment and the LCD panel 20 of the first embodiment, the transmittivity measured in the third color pixel 33 for displaying the red color changes (decreases) by 5.35% after the layout of the third liquid crystal alignment controlling structure 38 changes from LCD panel 20 to panel 30. As discussed with respect to the LCD panel 40 of the third embodiment and the LCD panel 50 of the fourth embodiment, the transmittivity measured in the second color pixel 42 for displaying the green color changes (decreases) by 9.17% after the layout of the second liquid crystal alignment controlling structure 47 changes from LCD panel 50 to panel 40. As discussed with respect to the LCD panel 20 of the first embodiment and the known LCD panel 10', the transmittivity measured in the first color pixel 21 for displaying the blue color changes (decreases) by 1.04% after the first liquid crystal alignment controlling structure 26 changes from LCD panel 10' to panel 20.

The reduction in color difference and the difference in transmittivity when the liquid crystal alignment controlling structure(s) of the color pixel for displaying the red color, green color and blue color change(s), respectively, are illustrated in Table 1 below.

TABLE 1

| | After the third liquid crystal alignment controlling structure changes (the red color pixel) | After the second liquid crystal alignment controlling structure changes (the green color pixel) | After the first liquid crystal alignment controlling structure changes (the blue color pixel) |
|---|---|---|---|
| Reduction in color difference | 0.0424 | 0.0013 | 0.0563 |
| Reduction in transmittivity | 5.35% | 9.17% | 1.04% |

As indicated in Table 1, after the layout of the liquid crystal alignment controlling structure of the color pixel for displaying the blue color changes, the color difference decreases significantly, and after the layout of the liquid crystal alignment controlling structure of the color pixel for displaying the green color changes, the transmittivity is affected greatly. Thus, in some embodiments, in order to significantly decrease the loss in transmittivity, the number of domains and boundaries (i.e., the number of protrusions) formed in the liquid crystal alignment controlling structure of the color pixel for displaying the green color needs to be reduced. Furthermore, in some embodiments, in order to significantly reduce the color difference between different views in the direction parallel to the long-axial direction and the direction perpendicular to the long-axial direction, the color pixel for displaying the blue color and the color pixels for displaying other colors need to have one or more different liquid crystal orientations. For example, the blue pixel in FIGS. 2, 3, 5 has the LC orientations A and C that are different from all of those (i.e., the LC orientations B and D) of the green color pixel, or the green color pixel in FIG. 4 has the LC orientations B and D that are different from all of those (i.e., the LC orientations A and C) of the blue pixel.

According to the LCD panel and the LCD device using the same as disclosed in the above embodiments of the invention, one or more liquid crystal orientations of at least one color pixel need to be different from those of the remaining color pixels, such that the difference of color shift between the direction parallel to the liquid crystal orientation and the direction perpendicular to the liquid crystal orientation decreases. Embodiments of the invention have one or more of the following advantages:

When the user switches the LCD panel between the horizontal display and the vertical display, the displayed picture has a lower difference of color shift, which is less noticeable to the user and allows the user to watch the displayed pictures more comfortably on the LCD panel.

In the disclosed LCD panel and an LCD device using the same, only modification of one or more layout(s) of the liquid crystal alignment controlling structure(s) of an MVA LCD panel is needed, without requiring changes to the existing manufacturing process of the MVA LCD panel.

In the disclosed LCD panel and an LCD device using the same, the feel of color shift of the entire displayed picture is reduced without using any additional elements, that is, without incurring extra cost.

While the disclosure has been given by way of examples and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
a first color pixel for displaying a first color;
a second color pixel disposed next to the first color pixel and for displaying a second color, the second color different from the first color;
a first liquid crystal alignment controlling structure for controlling liquid crystal molecules in the first color pixel to have at least four liquid crystal (LC) orientations;
a second liquid crystal alignment controlling structure for controlling liquid crystal molecules in the second color pixel to have multiple LC orientations; and
the first color pixel including a first LC orientation which is different from all the other LC orientations, and including a second LC orientation that liquid crystal molecules in the second color pixel have.

2. The LCD panel according to claim 1, wherein the first LC orientation is perpendicular to the second LC orientation.

3. The LCD panel according to claim 1, wherein the number of the LC orientations of the second color pixel is smaller than or equal to that of the first color pixel.

4. The LCD panel according to claim 3, wherein the second color is green.

5. The LCD panel according to claim 1, wherein each of the first and second liquid crystal alignment controlling structures comprises:
at least one protrusion defining the respective first or second LC orientation; and
at least one slit parallel to the at least one protrusion, wherein the at least one slit and the at least one protrusion are alternately disposed.

6. The LCD panel according to claim 5, wherein the second liquid crystal alignment controlling structure comprises three protrusions all parallel to the first LC orientation to define the second LC orientation perpendicular to the first LC orientation.

7. The LCD panel according to claim 6, wherein the first color is green.

8. The LCD panel according to claim 5, wherein the first liquid crystal alignment controlling structure comprises three protrusions, one protrusion is perpendicular to the second LC orientation, and the other two protrusions are parallel to the second LC orientation to define the first LC orientation perpendicular to the second LC orientation.

9. The LCD panel according to claim 8, wherein the first color is blue.

10. The LCD panel according to claim 7, wherein the second color is blue.

11. The LCD panel according to claim 9, wherein the second color is green.

12. The LCD panel according to claim 1, further comprising:
a third color pixel disposed next to the first or second color pixel and for displaying a third color different from both the first and second colors; and
a third liquid crystal alignment controlling structure for controlling LC orientations of liquid crystal molecules in the third color pixel;
wherein the number of the LC orientations of the liquid crystal molecules in the second color pixel is smaller than that of the first color pixel, and is smaller or equal to that of the third color pixel.

13. The LCD panel according to claim 12, wherein the third liquid crystal alignment controlling structures comprises:
at least one protrusion; and
at least one slit parallel to the at least one protrusion, wherein the at least one slit and the at least one protrusion are alternately disposed.

14. The LCD panel according to claim 13, wherein the second color is green.

15. The LCD panel according to claim 14, wherein the third liquid crystal alignment controlling structure comprises three protrusions, one protrusion is perpendicular to the second LC orientation, and the other two protrusions are parallel to the second LC orientation.

16. The LCD panel according to claim 15, wherein the third color is red.

17. The LCD panel according to claim 12, wherein
the first liquid crystal alignment controlling structure defines for the liquid crystal molecules in the first color pixel the second LC orientation, a third LC orientation and a fourth LC orientation, wherein the third LC orientation is opposite to the first LC orientation, and the fourth LC orientation is opposite to the second LC orientation, and
the third liquid crystal alignment controlling structure defines for the liquid crystal molecules in the third color pixel the first LC orientation, the second LC orientation, the third LC orientation and the fourth LC orientation.

18. An LCD device, comprising:
an LCD panel being a multiple-domain vertical alignment (MVA) LCD panel at least comprising:
a first color pixel for displaying a first color;
a second color pixel disposed next to the first color pixel and for displaying a second color, the second color different from the first color;
a first liquid crystal alignment controlling structure for controlling liquid crystal molecules in the first color pixel to have at least four liquid crystal (LC) orientations;
a second liquid crystal alignment controlling structure for controlling liquid crystal molecules in the second color pixel to have multiple LC orientations; and
the first color pixel including a first LC orientation which is different from all the other LC orientations, and including a second LC orientation that liquid crystal molecules in the second color pixel have; and
a backlight module for providing a light to be controllably passed through the LCD panel to display images.

19. A liquid crystal display (LCD) panel, comprising:
a first color pixel for displaying a blue color;
a second color pixel disposed next to the first color pixel and for displaying a green color;
a third color pixel disposed next to the second color pixel and for displaying a red color;
a first liquid crystal alignment controlling structure for controlling liquid crystal molecules in the first color pixel to have at least a first liquid crystal (LC) orientation;
a second liquid crystal alignment controlling structure for controlling liquid crystal molecules in the second color pixel to have at least second and third LC orientations; and
a third liquid crystal alignment controlling structure for controlling liquid crystal molecules in the third color pixel to have at least the second and third LC orientations;
wherein the first LC orientation is different from all the other LC orientations that liquid crystal molecules in the second color pixel have;
wherein said first liquid crystal alignment controlling structure comprises a protrusion defining said first LC orientation.

* * * * *